United States Patent
Kato et al.

(10) Patent No.: US 6,453,891 B2
(45) Date of Patent: Sep. 24, 2002

(54) EXHAUST GAS RECIRCULATION VALVE DEVICE

(75) Inventors: Yasuhiko Kato; Hisashi Yokoyama; Takeshi Ikai, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/934,577

(22) Filed: Aug. 23, 2001

Related U.S. Application Data

(63) Continuation of application No. PCT/JP99/07293, filed on Dec. 24, 1999.

(51) Int. Cl.$^7$ .......................... F02M 25/07; F16K 31/04
(52) U.S. Cl. ...................... 123/568.24; 251/129.12
(58) Field of Search ........................ 251/129.11, 129.12, 251/77, 322; 123/568.23, 568.24, 568.21, 568.11; 29/890.3

(56) References Cited

U.S. PATENT DOCUMENTS 4,915,083 A * 4/1990 Hewette et al. ........ 123/568.24
6,089,536 A * 7/2000 Watanabe et al. ...... 251/129.11
6,227,183 B1 * 5/2001 Miyoshi et al. ........ 123/568.23

FOREIGN PATENT DOCUMENTS

| JP | 8-151963 | 6/1996 |
| JP | 9-4744 | 1/1997 |
| JP | 9-256916 | 9/1997 |

* cited by examiner

Primary Examiner—Gene Mancene
Assistant Examiner—Arnold Castro
(74) Attorney, Agent, or Firm—Sughrue Mion, PLLC

(57) ABSTRACT

An exhaust gas recirculation valve device is provided with a motor shaft, a stepping motor main body driving the motor shaft, a valve shaft having a tip functioning as a proximal end which faces one end of the motor shaft and a distal end provided with a valve, a spring pushing the valve shaft in a closing direction, and a spring holder retaining the spring. In the case that the valve is cloned, the tip of the valve shaft and the spring holder are caulked together at a distance between the tip of the valve shaft and the one end of the motor shaft so that a distance between the facing ends of the motor shaft and the valve shaft is equivalent to a difference between a stroke of the motor shaft of the stepping motor main body and a stroke of the valve on opening.

6 Claims, 4 Drawing Sheets

FIG.3A
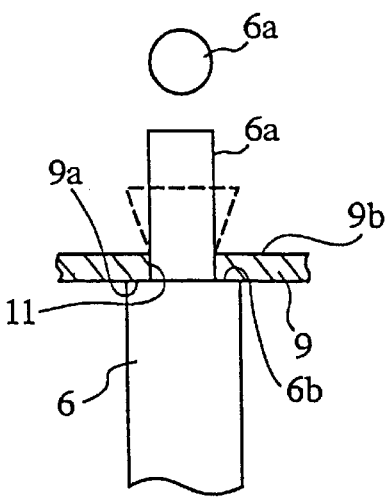
FIG.3B
FIG.4A
FIG.4B
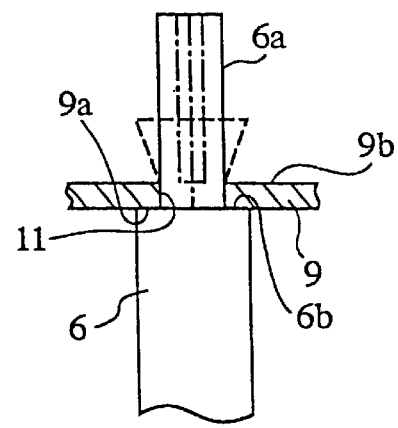
FIG.5
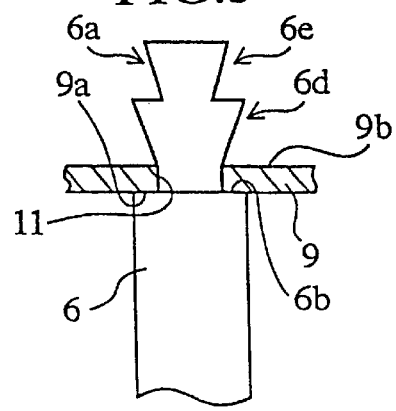

BEFORE CAULKING PROCESS    AFTER CAULKING PROCESS

EXHAUST GAS RECIRCULATION VALVE DEVICE

CROSS-REFERENCE TO THE RELATED APPLICATION

This application is a continuation of International Application No. PCT/JP99/07293, whose international filing date is Dec. 24, 1999, the disclosure of which Application are incorporated by reference herein. The present application has not published in English.

BACKGROUND OF THE INVENTION

Field of the Invention

The present invention relates to an exhaust gas recirculation valve device disposed in an exhaust gas recirculation passage of an internal combustion engine for example of an automobile.

Prior Art 1.

FIG. 1 is a cross sectional figure showing the internal structure of a conventional exhaust gas recirculation valve device. In the figure, the valve housing 1 has an input port 2 communicating with an exhaust system (not shown) of an engine which is an internal combustion engine, an output port 3 communicating with an air intake system (not shown) of the engine and a passage 4 interposed between the output port 3 and the input port 2. A valve seat 5 is press fitted into the passage 4. 6 is a valve rod passing through a bush 7. A valve 8 is mounted on the lower end of the valve rod 6 to abut or separate with the valve seat 5. 9 is a spring holder pushed upwardly by a coil spring 10. A through hole 11 is formed in the central section of the spring holder 9. A tip 6a of the valve rod 6 is fixed by caulking through the through hole 11. The valve rod 6 and the spring holder 9 are integrated by such a caulking and the valve 8 mounted on the lower end of the valve rod 6 is normally pushed in a closed positioning with respect to the valve seat 5 by the coil spring 10. 12 is a cooling water passage cooling the valve body and the motor to be described below.

20 is a stepping motor main body, and is mounted on the top section of the valve housing 1 so that the axial centers are aligned by a mounting screw 21. 22 is a motor housing, 23 is a motor holder disposed concentrically between the motor housing 22 and the valve housing 1. 24 are bobbins which are wound coils 25.26 and 27 are yokes. A magnetic path is formed through the outer periphery of the yokes 26 and 27. 28 is a terminal which is electrically connected to the coils 25. The terminal 28 and the motor housing 22 form a connector. 29 is a plate which shields the two coil sections magnetically. 30 is a magnet. 31 is a rotor retaining the magnet 30. The rotor 31 has a threaded section 31a threadably attached to a threaded section 32a of the motor shaft 32. 33 is a bushing mounted on the upper end of the rotor 31. 34 is a ball supported by the bushing 33. 35 is an adjustment plate, and 36 is a ball bearing mounted at the lower end of the rotor 31.

In the case that the valve housing 1 and the motor housing 22 above are assembled so that the axial centers are aligned by the mounting screw 21, an upper face of the tip 6a of the valve rod 6 near the valve housing 1 is set to oppose a lower face of the motor shaft 32 near the motor housing 22 at a required distance from the tip 6a.

The operation of the invention will be described below.

Firstly, when the engine is started and the valve is completely closed, the rotor 31 which contains a magnet 30 rotates in a stepwise manner in a direction of valve opening due to a pulsed voltage sent from the control unit (not shown) to the terminal 28 during the valve opening operation. The stepwise rotation is converted into linear motion by the threaded section 31a of the rotor 31 and the threaded section 32a of the motor shaft 32 and the motor shaft 32 displaces in a direction of valve opening (downwardly). As the displacement continues, at the moment when the upper face of the tip 6a of the valve rod 6 near the valve housing 1 touches to the lower face of the motor shaft 32 near the motor housing 22, the valve rod 6 is depressed by the drive force of the motor shaft 32 against the pushing upward force of the spring 10. Also the valve 8 which is mounted on the lower section of the valve rod 6 is lowered and opens with respect to the valve seat 5 and the input port 2 and the output port 3 are connected by the passage 4.

During the valve closure operation, the rotor 31 which contains a magnet 30 rotates in a stepwise manner in a direction of valve closure due to a pulsed voltage sent from the control unit (not shown) to the terminal 28 in an operation which is the opposite of the above. The motor shaft 32 displaces in a direction of valve closure (upwardly) due to the rotation. In addition to the rotation, the valve rod 6 is raised by the upward pushing force of the spring 10 and the valve 8 shuts the passage between the valve 8 and the valve seat 5.

It is noted that in the above exhaust gas recirculation valve device which uses a stepping motor, when a valve opening step varies, the rate of exhaust gas flow also varies. Therefore, in order to pass a target flow rate of the exhaust gas, the valve opening step must be constant. The valve opening step is determined by a distance L between the tip 6a of the valve rod 6 and the lower face of the motor shaft 22. However, the distance L depends on the accuracy of dimension of parts such as bushing 33 and the ball 34, which are disposed on the upper section of the motor shaft 32. Therefore, the distance L, which is defined between the tip 6a of the valve rod 6 and the lower face of the motor shaft 22, must be adjusted when the valve housing 1 and the motor housing 22 do assembly about every exhaust gas recirculation valve device.

According to the conventional adjustment method, firstly a distance L1 between the upper face of the tip 6a of the valve rod 6 and the upper face of the valve housing 1 and a distance L2 between the lower face of the motor shaft 32 and the lower face of the motor housing 22 are measured. In order to determine an appropriate distance L, a stroke of the motor shaft 32 is then considered to calculate an adjustment thickness L3. The adjustment plate 35 having a thickness corresponding to the adjustment thickness L3 is interposed between the both abutting sections of the valve housing 1 and the motor housing 22 to adjust the distance L so as to be constant. In other words, with the conventional adjustment method, since the distance L satisfies an equation of L=(L1−L2)+L3 and the distances L1 and L2 vary in all products, the distance L is adjusted by varying the adjustment thickness L3.

However, since the conventional exhaust gas recirculation valve device is constituted as described above, when one kind of metallic plate functioning as the adjustment plate 35 having a thickness of 0.1 mm, for example, is prepared, there are occasions when many metallic plates must be interposed therebetween. This raises the manufacturing costs. Therefore, in order to reduce the number of metallic plates interposed therebetween, various kinds of metallic plates which function as an adjustment plate 35 are prepared with a thickness varying from 0. 1 mm to 0.5 mm in increments of 0.1 mm. Therefore, the use of the plates differs as a result of this processing. As a result, there are problems in time and effort with respect to the stock-control.

Prior Art 2.

JP-A-1997/256916 discloses an exhaust gas recirculation valve including a seat valve for opening/closing an exhaust gas circulation passage, and a valve actuator moving a valve body of the seat valve in a forward or backward direction to open/close the passage above. With the exhaust gas recirculation valve, seat parts with a variety of thicknesses are disposed between a valve shaft of the seat valve and a central piston of the valve actuator. Thus, the axial variations in component dimensions are absorbed in order to control a stroke of the valve on opening.

However, with the exhaust gas recirculation valve, the seat parts for adjustment of thicknesses are also used, and the axial variations in component dimensions of the valve shaft and so on, are absorbed in a like manner of the prior art 1. Since the seat parts prepared have a variety of thicknesses, there are problems with respect to increase in manufacturing costs and in the time and effort expended in stock control.

The present invention resolves the problems above, and it is an objective of the present invention to provide an exhaust gas recirculation valve device controlling a valve open timing with high accuracy without using the adjustment plates or the seat parts.

SUMMARY OF THE INVENTION

The exhaust gas recirculation valve device according to the present invention includes a first shaft arranged reciprocally in an axial direction, a driving means driving the first shaft, a second shaft having a proximal end which faces one end of the first shaft and a distal end provided with a valve, a pushing means pushing the second shaft in a closing direction, and a retaining means retaining the pushing means. Here, in the exhaust recirculation valve, a caulking length of the second shaft is determined to fix the retaining means so that a distance between the facing ends of the first and second shafts is equivalent to a specific value with the valve closure. In this way, it is not necessary to use the adjustment plates or the seat parts which have been used conventionally to control the distance and thus it is possible to simplify stock-control and to reduce the manufacturing costs of the exhaust gas recirculation valve device. It is also possible to perform flexibly stepless control of the distance and thus it is possible to control a valve open timing with high accuracy.

With the exhaust gas recirculation valve device, the driving means is a stepping motor. In this way, it is possible to absorb effectively the distance between the facing ends of the first and second shafts due to a single working step of determining the amount of caulking of the second shaft.

With the exhaust gas recirculation valve device, the second shaft has a central hole extending from the proximal end to the vicinity of the retaining means. In this way, it is possible to reduce the volume of the caulking fixation section in the second shaft and thus it is possible to shorten the time required in order to fix the second shaft with caulking.

With the exhaust gas recirculation valve device, the proximal end of the second shaft includes a caulking fixation section and a height-adjustment section formed at a top of the caulking fixation section and formed its diameter smaller than the caulking fixation section. In this way, it is possible to ensure a sufficient caulking force of the second shaft with respect to the retaining means due to the caulking fixation section. It is also possible to ensure a sufficient height of the proximal end of the second shaft after caulking with respect to the retaining means due to the height-adjustment section and thus it is easy to control the distance above.

BRIEF DESCRIPTION OF THE DRAWINGS

FIG. 3A and FIG. 3B are enlarged views showing a caulking section of a valve shaft in the exhaust gas recirculation valve device of FIG. 2, FIG. 3A is a plan view, and FIG. 3B is a front view.

FIG. 4A and FIG. 4B are enlarged views showing a caulking section of a valve shaft in an exhaust gas recirculation valve device according to a second embodiment of the present invention, FIG. 4A is a plan view, and FIG. 4B is a front view.

FIG. 5 is an enlarged view showing a caulking section of a valve shaft in an exhaust gas recirculation valve device according to a third embodiment of the present invention.

PREFERRED EMBODIMENTS OF THE INVENTION

In order to describe the invention in greater detail, the preferred embodiments will be outlined below with reference to the accompanying figures.

Embodiment 1

Figure 1:
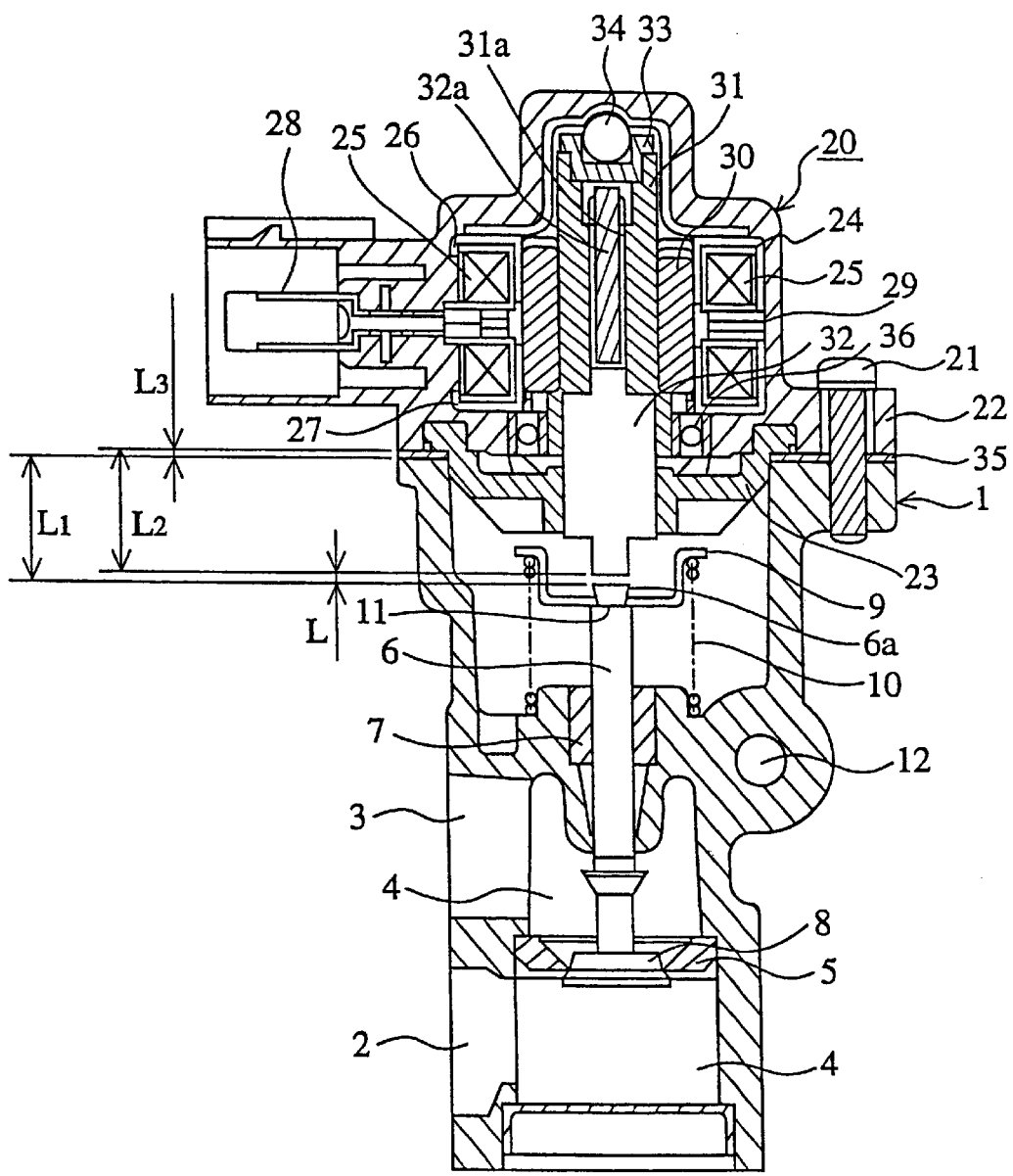
FIG. 1 is a cross sectional figure showing the internal structure of an exhaust gas recirculation valve device according to the prior art 1.
Figure 2:
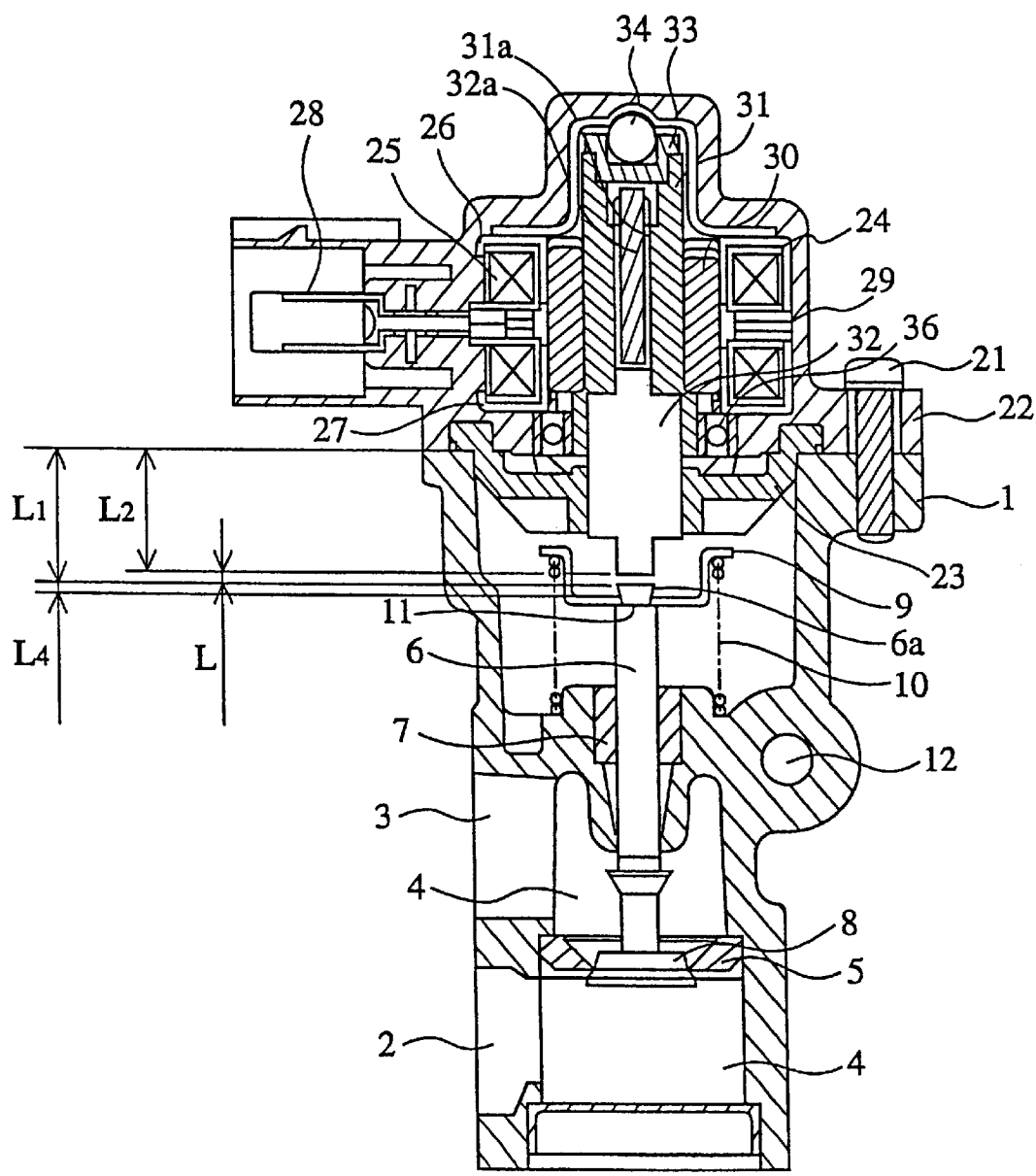
FIG. 2 is a cross sectional figure showing the internal structure of an exhaust gas recirculation valve device according to a first embodiment of the present invention.

FIG. 2 is a cross sectional figure showing the internal structure of an exhaust gas recirculation valve device according to a first embodiment of the present invention. FIG. 3A and FIG. 3B are enlarged views showing a caulking section of a valve shaft in the exhaust gas recirculation valve device of FIG. 2, FIG. 3A is a plan view, and FIG. 3B is a front view. Those components of the first embodiment of the present invention which are the same as those of the conventional exhaust gas recirculation valve device as shown in FIG. 1 are denoted by the same reference numerals and further description will be omitted.

With the embodiment 1, as shown in FIG. 3A and FIG. 3B, the tip (made in a solid line) 6a, which is a proximal end of the valve rod 6 acting as the second shaft, is formed as a cylindrical solid section. The tip 6a of the valve rod 6 is inserted into the through hole 11 of the spring holder 9. A shoulder section 6b is caulked and fixed to the spring holder 9 with a state that the shoulder section 6b abuts with a lower face 9a of the spring holder 9 which is arranged around the through hole 11.

Figure 3C:
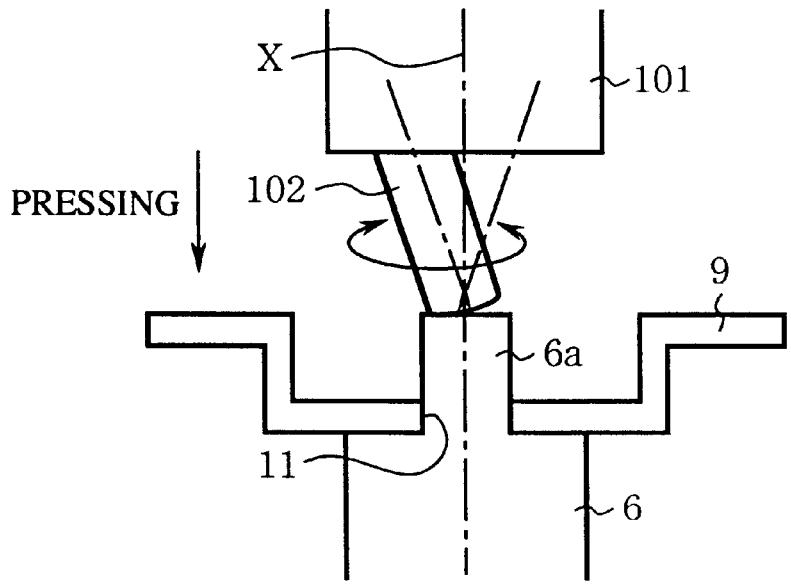
FIG. 3C, FIG. 3D and FIG. 3E are enlarged cross sectional views of the valve shaft showing a caulking process according to the first embodiment of the present invention.

A caulking process includes the steps of: 1) inserting a tip 6a of a valve rod 6 into a thorough hole 11 of a spring holder 9, 2) setting the valve rod 6 in a caulking machine 101 having a rod 102 whose longitudinal direction inclines slightly from a rotation axis X, 3) rotating the rod 102 around the rotation axis X at high speed, as shown in FIG. 3C, and 4) pressing the rod 102 against the tip 6a.

Figure 3D:
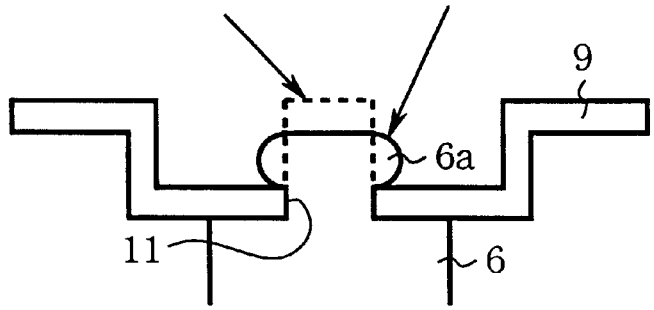

By the caulking process, the tip 6a is crushed and becomes wider than the diameter of the through hole 11, as shown in FIG. 3D. Therefore, the valve rod 6 does not fall off the spring holder 9 and it is fixed to the valve rod 6.

Figure 3E:
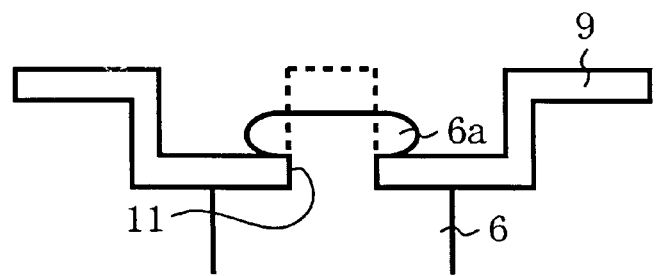

After the fixation of the spring holder 9, a total length of the valve rod 6 is adjusted by crushing the tip 6a further, as shown in FIG. 3E. Therefore, a distance between the facing ends of the valve rod 6 and a motor shaft is adjusted to a specific value.

A height of the tip 6a after caulked and fixed to an upper face 9b of the spring holder 9 is set so that the distance L, which is defined between a lower end of the motor shaft 32 acting as the first shaft and an upper end of the tip (made in a broken line) 6a of the valve shaft 6 after caulked, is equivalent to a difference between a stroke of the motor shaft 32 of the stepping motor main body 20 acting as the driving means and a stroke of the valve 8 on opening when the motor housing 22 is mounted on the valve housing 1 so that the axial centers are aligned by the mounting screw 21. In this way, it is not necessary to prepare the adjustment plates 35 or the seat parts, which have been used conventionally for controlling the distance L, and thus it is possible to simplify the stock-control and to reduce the manufacturing costs of the exhaust gas recirculation valve device. It is also possible to perform flexibly stepless control of the distance and thus it is possible to control a valve open timing with ease and high accuracy without using the adjustment plates 35 or the seat parts.

As shown above, according to the embodiment 1, it is not necessary to prepare the adjustment plates 35 or the seat parts, which have been used conventionally for controlling the distance L, and thus it is possible to simplify the stock-control and to reduce the manufacturing costs of the exhaust gas recirculation valve device. According to the embodiment 1, if the variations in dimension of the parts and the stroke of the driving means occur, it is not necessary to use the adjustment plates 35 or the seat parts and it is possible to perform flexibly stepless control of the distance L. In this way, it is possible to control a valve open timing with high accuracy and thus is it possible to keep the valve opening step constant.

With the embodiment 1, the stepping motor is taken as an example of the driving means. Alternatively, a DC motor or a variety of pushing means may be used as the driving means.

Embodiment 2

FIG. 4A and FIG. 4B are enlarged views showing a caulking section of a valve shaft in an exhaust gas recirculation valve device according to a second embodiment of the present invention, FIG. 4A is a plan view, and FIG. 4B is a front view.

The embodiment 2 is characterized in that a central hole 6c is formed at the tip 6a of the valve rod 6. In the case that the height of the tip 6a after caulked is set to a minimum level for example, it is necessary to caulk the tip 6a more which is subjected to a caulking processing and thus to take a long time for the caulking processing. Therefore, it is possible to shorten the time for caulking processing considerably due to the central hole 6c by reducing the volume of the tip 6a. The central hole 6c extends from the upper end of the tip 6a to the vicinity of the spring holder 9. The size and length of the central hole 6c are determined as appropriate by making a comparison between a point in that it is necessary to ensure a sufficient caulking force applied to the spring holder 9 due to the caulking processing with respect to the tip 6a of the valve rod 6 and the other point in that it is necessary to ensure a sufficient height of the tip 6a with respect to the upper face 9b of the spring holder 9 after caulking in order to keep the distance L constant.

As shown above, according to the embodiment 2, the central hole 6c is arranged at the tip 6a of the valve rod 6 and thus it is possible to have the same effect as the embodiment 1. It is also possible to shorten extensively the time for the caulking processing by reducing the volume of the tip 6a.

Embodiment 3

FIG. 5 is an enlarged view showing a caulking section of a valve shaft in an exhaust gas recirculation valve device according to a third embodiment of the present invention.

The embodiment 3 is characterized in that the tip 6a of the valve rod 6 includes a caulking fixation section 6d and a height-adjustment section 6e formed at a top of the caulking fixation section and formed its diameter smaller than the caulking fixation section. In the case that the height of the tip 6a after being caulked is set to a maximum level for example, the length of the tip 6a which is subjected to a caulking processing is short and thus it is difficult to ensure a sufficient caulking force. In this way, the caulking fixation section 6d for ensuring the sufficient caulking force with a slight length subjected to the caulking processing and the height-adjustment section 6e for ensuring a sufficient height of the tip 6a after caulked are stacked.

In order to caulk and fix the tip 6a to the spring holder 9, a tool is rotated on an outermost of the caulking fixation section 6d about a center axis of the caulking fixation section 6d and the height-adjustment section 6e and thus it is possible to perform effectively a working of the caulking processing.

As shown above, according to the embodiment 3, it is possible to have the same effect as the embodiment 1. It is possible to ensure a sufficient caulking force applied to the spring holder 9 due to the tip 6a of the valve rod 6 and to ensure the sufficient height of the tip 6a with respect to the upper face 9b of the spring holder 9 after caulking.

As shown above, with the exhaust gas recirculation valve device according to the present invention, a length of the second shaft subjected to a caulking processing with respect to the retaining means is determined so that a distance between the facing ends of the first and second shafts is equivalent to a specific value with the valve closure. In this way, it is not necessary to prepare the adjustment plates or the seat parts which have been used conventionally to control the distance and thus it is possible to simplify the stock-control and to reduce the manufacturing costs of the exhaust gas recirculation valve device. It is also possible to perform flexibly a stepless control of the distance and thus it is possible to control a valve open timing with high accuracy.

What is claimed is:

1. An exhaust gas recirculation valve device, comprising:
   a first shaft arranged reciprocally in an axial direction;
   a driving means driving the first shaft;
   a second shaft having a proximal end which faces one end of the first shaft and a distal end provided with a valve;
   a pushing means pushing the second shaft in a closing direction; and
   a retaining means retaining the pushing means,
   wherein a length of the proximal end of the second shaft with respect to the retaining means is determined so that a distance between the facing ends of the first and second shafts is equivalent to a specific value when the valve is closed.

2. The exhaust gas recirculation valve device according to claim 1, wherein the driving means is a stepping motor.

3. The exhaust gas recirculation valve device according to claim 1, wherein the second shaft has a central hole extending from the proximal end to the vicinity of the retaining means.

4. The exhaust gas recirculation valve device according to claim 2, wherein the second shaft has a central hole extending from the proximal end to the vicinity of the retaining means.

5. The exhaust gas recirculation valve device according to claim 1, wherein the proximal end of the second shaft includes a caulking fixation section and a height-adjustment section formed at a top of the caulking fixation section and formed with a diameter smaller than the caulking fixation section.

6. The exhaust gas recirculation valve device according to claim 2, wherein the proximal end of the second shaft includes a caulking fixation section and a height-adjustment section formed at a top of the caulking fixation section.

* * * * *